(12) United States Patent
Raza et al.

(10) Patent No.: US 7,649,847 B2
(45) Date of Patent: Jan. 19, 2010

(54) ARCHITECTURES FOR EVOLVING TRADITIONAL SERVICE PROVIDER NETWORKS AND METHODS OF OPTIMIZATION THEREFOR

(75) Inventors: Humair Raza, Richardson, TX (US);
Ra'ed Awdeh, Richardson, TX (US);
Kesavamurthy Nagaraj, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 794 days.

(21) Appl. No.: 11/031,715

(22) Filed: Jan. 7, 2005

(65) Prior Publication Data
US 2005/0122968 A1 Jun. 9, 2005

Related U.S. Application Data

(62) Division of application No. 09/658,530, filed on Sep. 7, 2000, now Pat. No. 6,870,813.

(51) Int. Cl.
*H04L 12/28* (2006.01)
*H04L 12/66* (2006.01)
*H04J 3/02* (2006.01)

(52) U.S. Cl. .................. 370/238; 370/352; 370/404; 370/539

(58) Field of Classification Search ............. None
See application file for complete search history.

(56) References Cited

U.S. PATENT DOCUMENTS 5,546,542 A * 8/1996 Cosares et al. ............. 709/241

(Continued)

OTHER PUBLICATIONS

P. Wong, M. Yin, "An Economic Analysis for Core Optical Transposrt Networks", Proc. of NFOEC '99, vol. 2, pp. 254-264, Sep. 1999.

(Continued)

*Primary Examiner*—Chi H Pham
*Assistant Examiner*—Soon-Dong D Hyun
(74) *Attorney, Agent, or Firm*—Blakely, Sokoloff, Taylor & Zafman LLP

(57) ABSTRACT

The present invention discloses novel network architectures for evolving traditional service provider networks. The network architecture of the invention has a transport layer including an optical network. At least one node of the network architecture includes a large packet switch that is coupled to the transport layer and to an access layer. The large packet switch aggregates a plurality of services from the access layer. The large packet switch also performs packet level grooming of the information from the services prior to transport of the information via the transport layer. The optical network performs restoration for the network architecture. In one embodiment, the optical network is an optical ring network including at least one optical switch and restoration is performed at the layer-0 (optical layer). In another embodiment, the optical network is a bi-directional line-switched ring (BLSR) utilizing a Synchronous Optical Network (SONET) standard and restoration is performed by the layer-1 (SONET layer). The network architectures of the invention by utilizing a large packet switch to perform service aggregation and packet level grooming, and by performing restoration either at the layer-0 (optical layer) or layer-1 (SONET layer), creates a single converged network that achieves the superior restoration performance needed for carrier grade availability but at much lower costs than traditional service providers which operate multiple overlay networks. Also disclosed are methods to optimize traditional service provider networks and the disclosed novel architectures of the invention.

14 Claims, 8 Drawing Sheets

U.S. PATENT DOCUMENTS

| | | | |
|---|---|---|---|
| 6,046,833 | A | 4/2000 | Sharma et al. |
| 6,047,331 | A | 4/2000 | Medard et al. |
| 6,061,482 | A | 5/2000 | Davis |
| 6,256,292 | B1 | 7/2001 | Ellis et al. |
| 6,374,202 | B1 * | 4/2002 | Robinson ................... 703/13 |
| 6,389,015 | B1 * | 5/2002 | Huang et al. ............... 370/376 |
| 6,426,831 | B1 | 7/2002 | Schmidt et al. |
| 6,499,006 | B1 * | 12/2002 | Rappaport et al. ........... 703/20 |
| 6,510,139 | B1 * | 1/2003 | Yoshida ..................... 370/238 |
| 6,532,088 | B1 | 3/2003 | Dantu et al. |
| 6,647,428 | B1 | 11/2003 | Bannai et al. |
| 6,654,354 | B1 * | 11/2003 | Watkins et al. ............. 370/258 |
| 6,798,747 | B1 * | 9/2004 | Watkins et al. ............. 370/238 |
| 6,870,813 | B1 * | 3/2005 | Raza et al. .................. 370/238 |
| 6,971,063 | B1 * | 11/2005 | Rappaport et al. .......... 715/733 |

OTHER PUBLICATIONS

D. Kaufman, et al., "The Opical Internet—A New Network Architecture", Proc. of NFOEC '99, vol. 2, pp. 93-103, Sep. 1999.

C. Labovitz, et al., "Experimental Study of Internet Stability and Backbone Failures", 29th Annual International Symposium of Fault Tolerant Computing, pp. 278-285, 1999.

J.C. Simon, et al., "All Optical Regenerating", 24th European Conference on Optical Comunication, vol. 1, pp. 467-469, 1998.

* cited by examiner

ARCHITECTURES FOR EVOLVING TRADITIONAL SERVICE PROVIDER NETWORKS AND METHODS OF OPTIMIZATION THEREFOR

This application is a Divisional of application Ser. No. 09/658,530, filed Sep. 7, 2000 now U.S. Pat No. 6,870,813.

BACKGROUND

1. Field of the Invention

The present invention relates generally to architectures for service provider networks, and more particularly, to novel architectures for evolving traditional service provider networks and methods to optimize traditional service provider networks, as well as, the disclosed novel architectures.

2. Description of Related Art

As is known in the art, a traditional service provider network includes a plurality of processing sites generally referred to as stations or nodes connected by one or more physical and/or logical connections. When the connections establish transmission of a signal in one direction between the nodes, the connections are generally referred to as links. Each node typically performs a switching function and one or more additional functions. The nodes may be coupled together in a variety of different network structures typically referred to as network topologies. For example, network nodes may be coupled in a circular structure, generally referred to as a ring topology. Other topologies such as star topologies and tree topologies are also known.

The transmission of a signal from a first or source node to a second or destination node may involve the transmission of the signal through a plurality of intermediate links and nodes coupled between the source node and the destination node. Such a succession of links and nodes between a source node and a destination node is referred to as a path. When a link or node in a path fails, communication between a source node and a destination node in that path is disrupted. Thus, to continue communications between the source and destination nodes, an alternate path must be found and the signal being transmitted from the source node to the destination is routed through the alternate path.

A self-healing network refers to a network that automatically restores connections among nodes in the event of a link or node failure in a path from a source node to a destination node. There is a growing trend and reliance on such networks owing to increasing reliance on and use of high-speed communication networks and the requirement that these communication networks be robust in the case of certain failures. Self-healing networks typically detect and report a failure, establish and connect a restoration path and then return the network to normal communications. Such self-healing characteristics are incorporated, for example, in the Synchronous Optical Network (SONET) protocols.

Generally, a Synchronous Optical Network (SONET) is both a standard and a set of specifications for building high speed, digital communications networks that run over fiber-optic cables while interfacing with existing electrical protocols and asynchronous transmission equipment. The use of fiber-optics in such networks provides a dramatic increase in available bandwidth (currently estimated in the hundreds of gigabits per second). One of the principal benefits of SONET is that it allows for the direct multiplexing of current network services, such as DS1, DS1C, DS2, and DS3 into the synchronous payload of Synchronous Transport Signals (STS). The STS provide an electrical interface that is used as a multiplexing mechanism within SONET Network Elements (NE). In the SONET multiplexing format, the basic signal transmission rate, i.e., STS-1, operates at 51.84 million bits per second. AN STS-1 can carry 28 DS1 signals or one asynchronous DS3. STS-1 signals are then multiplexed to produce higher bit rates STS-2, STS-3, etc. This sometimes referred to as grooming. SONET signal levels are also defined in terms of an optical carrier (OC). Since the bit rates are the same in each case, the bit rate of the STS-1 equals the bit rate of the OC-1 with the only difference relating to the type of signal that is being referenced. For example, if the signal is in an electrical format, it is referred to as an STS. Similarly, if the signal is in an optical format compatible with a fiber medium, the signal is referred to as an OC.

SONET uses time division multiplexing (TDM) wherein multiple channels are given different time slots within a frame. Each node in a SONET based network includes an add-drop multiplexer (ADM) that interfaces the fibers to the electronic devices that are to communicate with each other over the network. A SONET network provides reliable transport from point to point and has the capability of providing "restoration." The SONET ADM provides two broad functions. The first function is extracting information in one of the time slots from the incoming working fibers and outputting information into that time slot for transmission (along with the information in the other time slots) on the fiber that continues in the same direction. The second function is performing electrical switching to reroute information onto the protection fibers in the event of a failure in one or more of the fiber links.

One of the most common ways in SONET to "restore" network functionality rapidly is to combine Self Healing Rings (SHRs) and diversity protection (DP), using add-drop multiplexers (ADMs), for automatic protection switching. Systems using One-to-n (1:n) DP have one protected fiber for n working fibers. SHR architectures may be classified into unidirectional rings, in which the duplex channel travels over a different path than the forward channel, and bi-directional line switched rings (BLSRs) where the forward channel and the duplex channel travel the same path. Bi-directional line switched rings (BLSRs) typically include two or four fibers. Using ADMs, the restoration time is typically about 50 milliseconds (ms) for BLSRs utilizing SONET protocols while path switching typically requires less than 20 ms and loopback switching typically require under 80 ms.

Traditional service provider networks typically own and operate multiple overlay SONET-based BLSR networks. FIG. 1 is a diagram illustrating an example of a typical network architecture 100 representing the existing overlay networks of a traditional service provider network. An exemplary node (e.g. a core node or a transport node) is shown in FIG. 1. An access layer 102 (below the line 103) provides various services to the network and a transport layer 120 connects together the nodes of the network. In this example the services provided are: Time Division Multiplexing (TDM) voice (domestic and international) and private lines (PL) 104, voice-over IP (VoIP), Asynchronous Transfer Mode (ATM) and Frame Relay (FR) 106, Internet Protocol (IP) 108—dial-up or virtual private network (VPN), and leased λ service 109 (e.g. OC-48 rate). The private lines are supported through appropriate grooming at the transport layer 120. Similarly, the leased λ service is provided and restored through an optical switch 128 having both working and protected (W and P) lines. At the transport layer 120 (above the line 103), typical service providers sometimes utilize a bi-directional line-switched ring (BLSR) network architecture 124 that utilizes the SONET protocols previously discussed. The BLSR architecture 124 includes both working and protected (W and P) lines. Unfortunately, for each service the traditional service provider network provides (e.g. Voice, IP, ATM), the traditional service provider must operate a separate overlay network, thus utilizing multiple overlay BLSR networks, which becomes very costly.

Although these types of network architectures used by traditional service providers are capable of supporting most existing services, as IP-based services and traffic grow, a more cost effective network architecture is needed. The cost associated with building and operating multiple overlay networks has become an impeding factor for traditional service providers to stay competitive.

SUMMARY

The present invention relates to novel network architectures for evolving traditional service provider networks and methods to optimize traditional service provider networks, as well as, the disclosed novel architectures. Particularly, in one embodiment, the network architecture of the invention creates a single converged network having nodes that perform service aggregation and a transport network that provides restoration in the optical domain, providing superior performance at lower costs than traditional service providers, which operate multiple overlay networks.

The network architecture of the invention has a transport layer including an optical network. At least one node of the network architecture includes a large packet switch that is coupled to the transport layer and to an access layer. The large packet switch aggregates a plurality of services from the access layer. The large packet switch also performs packet level grooming of the information from the services prior to transport of the information via the transport layer. The optical network performs restoration for the network architecture. In one embodiment, the transport network is an optical ring network including at least one optical switch and restoration is performed at the layer-0 (optical layer). In another embodiment, the transport network is a bi-directional line-switched ring (BLSR) utilizing a Synchronous Optical Network (SONET) standard and restoration is performed by the layer-1 (SONET layer). The network architectures of the invention, by utilizing a large packet switch to perform service aggregation and packet level grooming, and by performing restoration either at the layer-0 (optical layer) or the layer-1 (SONET layer), creates a single converged network that achieves the superior restoration performance needed for carrier grade availability but at much lower costs than traditional service providers which operate multiple overlay networks.

The availability of large packet switches capable of supporting multiple services and the maturity of optical technology are taken advantage of in the network architectures of the present invention to provide new, attractive alternatives to evolve traditional SONET-based networks. Furthermore, the network architectures of the present invention can support a rich mixture of new and existing services without sacrificing carrier grade availability. Also disclosed are methods to optimize traditional service provider networks and the disclosed novel architectures of the invention.

According to other embodiments of the present invention, methods to optimize traditional service provider network architectures, as well as, the previously described novel network architectures, are also provided. First, a traffic model of various services to be carried through the network is generated. A cost optimization for the various services is performed. For traditional service provider networks, core node locations are selected for each service based upon the cost optimization for each service. In the case of the novel network architectures, core node locations are selected for the aggregated services based upon the cost optimization of the aggregated services. A set of routed transport demands is generated based upon the traffic model and the core node locations. For traditional service providers, optimized transport layer network designs are determined for each service based upon the routed transport demands of each service. In the case of the novel network architectures, an optimized converged optical transport layer network design is determined for the aggregated services based upon the routed transport demands of the aggregated services. An optimized access layer network design for the services is also determined. Advantageously, this method produces network designs that are optimized at each layer, i.e. the transport and access layer, in terms of traffic demands, and at the same time are also cost optimized at each layer, thereby minimizing the overall cost of the network solutions.

Other features and advantages of the present invention will be set forth in part in the description which follows and the accompanying drawings, wherein the preferred embodiments of the present invention are described and shown, and in part will become apparent to those skilled in art upon examination of the following detailed description taken in conjunction with the accompanying drawings, or may be learned by the practice of the present invention. The advantages of the present invention may be realized and attained by means of the instrumentalities and combinations particularly pointed out in the appended claims.

BRIEF DESCRIPTION OF THE DRAWINGS

The features and advantages of the present invention will become apparent from the following description of the present invention in which.

Figure 1:
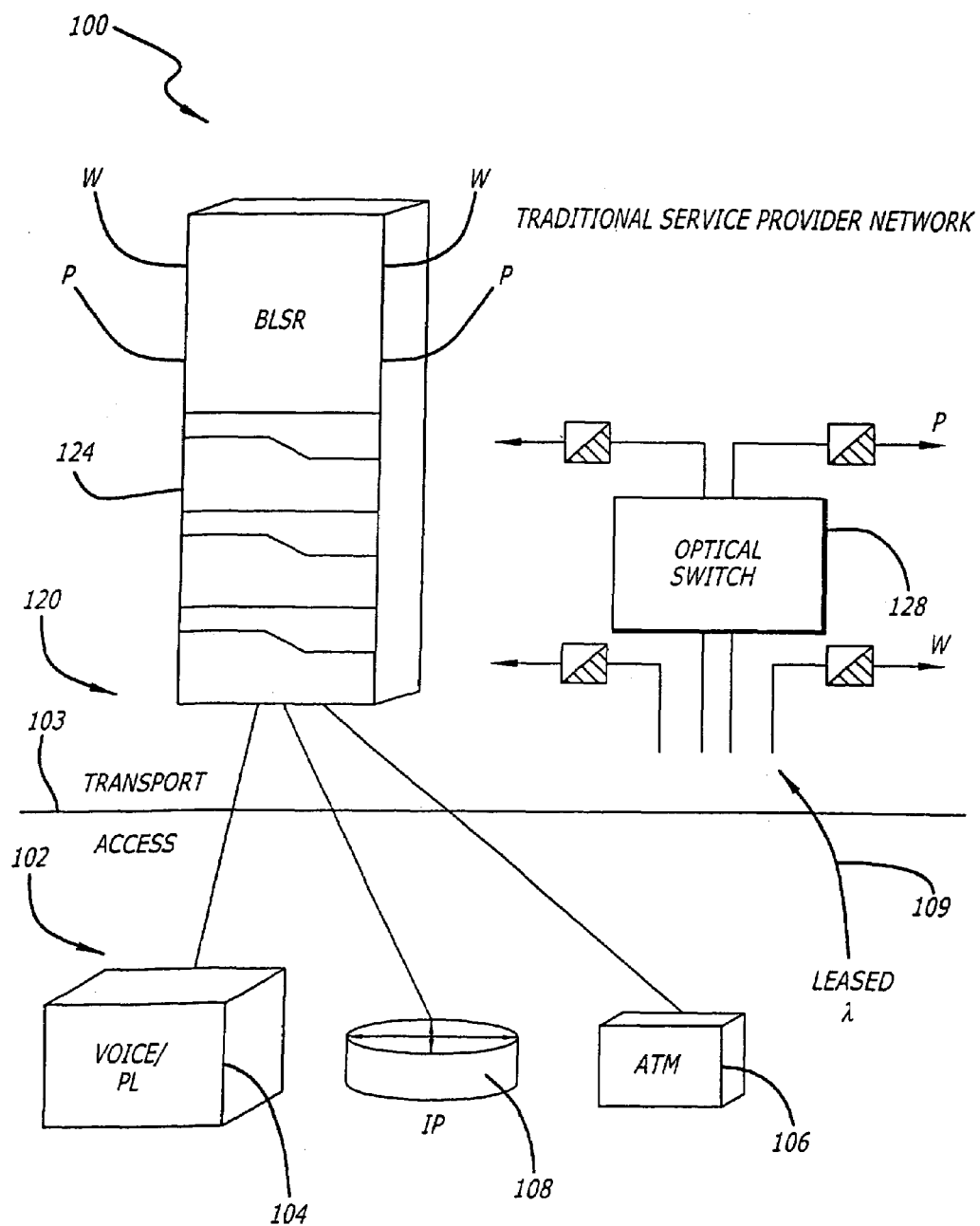
FIG. 1 is a diagram illustrating an example of a typical architecture representing the existing overlay networks of a traditional service provider network.

versus the various novel network architectures (FIGS. 2-5) according to embodiments of the invention.

DESCRIPTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, procedures, components, electrical structures and circuits, are not described in detail, or are shown in block diagram form, in order not to obscure the present invention. Furthermore, the present invention will be described in particular embodiments but may be implemented in hardware, software, firmware, middleware, or a combination thereof.

In alternative embodiments, the present invention may be applicable to implementations of the invention in integrated circuits or chip sets, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Discussions of network communications are often with reference to a network layer model, such as the International Standards Organization (ISO) Open Systems Interconnection (OSI) reference model. The OSI layers, from the highest to the lowest, include the application layer, the presentation layer, the session layer, the transport layer, the network layer, the data link layer, and the physical layer.

The application layer supports semantic exchanges between applications and provides access to the lower functions and services. The presentation layer deals with representing data to the end user or application. The session layer organizes and structures the interaction between applications and devices. The transport layer is responsible for transparent and reliable transfer of data without regard to the nature and attributes of the transfer medium. The network layer (layer-3) establishes communication between networks and is concerned with addressing, routing, and relaying information. The data link layer (layer-2) provides functions and protocols for transferring data between network resources and detecting errors in the physical layer. The physical layer (e.g. layer-1 SONET), in addition to defining the actual mechanical, electrical, or optical characteristics of the communication medium, also defines the functional and procedural standards for the physical transmission of data over the communications medium. The International Telecommunications Union (ITU) has defined a new layer called the optical layer (termed the layer-0 (optical layer) in this application) which includes, from top to bottom, an optical channel or lightpath layer, a optical multiplex section layer, and an optical amplifier section layer.

In an optical fiber network system, an electrical signal is converted to an optical signal, typically by modulating a laser diode emitting light at a wavelength suited for propagation along the fiber. The capacity of optical fiber network systems has been increased by the use of wavelength division multiplexing. In an optical wavelength division multiplexing system, optical signals with several carrier wavelengths are transmitted on the same optical fiber. Each carrier is individually modulated by a separate optical transmitter and carries different information. The individual carriers are multiplexed by a wavelength division multiplexer (WDM) into a single optical fiber. At the receiving end, a wavelength division multiplexer separates the individual carriers. The individual carriers are received by separate optical receivers.

Wavelength multiplexers and demultiplexers are often referred to generically as WDM couplers. It is also possible to use WDM couplers to establish bi-directional operation on a single fiber, and WDM couplers optimized for such use are often referred to as bi-directional WDM couplers. Some other optical elements such as isolators and circulators are often used in conjunction with WDM couplers to establish bi-directional communications over a single fiber with reduced cross-talk, back-reflection, etc. Although these elements are not essential in theory, they are useful in practice. A given optical fiber that supports transmission at a given wavelength is likely to support transmission at a number of closely spaced wavelengths. However, it is typically the case that optical amplifiers are disposed at various locations in the path, say every 80 km, and a typical single-wavelength fiber link is likely to have amplifiers that only operate correctly for the single wavelength that is being transmitted on the fiber. A different optical amplifier may be needed to support multi-wavelength operation.

Wavelength division multiplexing has increased substantially the potential capacity of optical network services. The optical band around 1550 nanometers can carry over thirty separate OC192 channels. Thus, with wavelength division multiplexing, a single optical fiber can carry over three million simultaneous telephone conversations. Optical network systems consist of equipment, which includes transmitters, receivers and switches, and facilities, which include the physical transport medium, i.e. optical fiber cable, and various regeneration and amplification devices. Because of the tremendous volume of calls carried on each channel, it is necessary that service not be interrupted for any significant amount of time in the event of a facility or equipment failure.

The network architecture of the invention has a transport layer including an optical network. At least one node of the network architecture includes a large packet switch that is coupled to the transport layer and to an access layer. The large packet switch aggregates a plurality of services from the access layer. The large packet switch also performs packet level grooming of the information from the services prior to transport of the information via the transport layer. The optical network performs restoration for the network architecture. In one embodiment, the optical network is an optical ring network including at least one optical switch and restoration is performed at the layer-0 (optical layer). In another embodiment, the optical network is a bi-directional line-switched ring (BLSR) utilizing a Synchronous Optical Network (SONET) standard and restoration is performed by the layer-1 (SONET layer).

Figure 2:
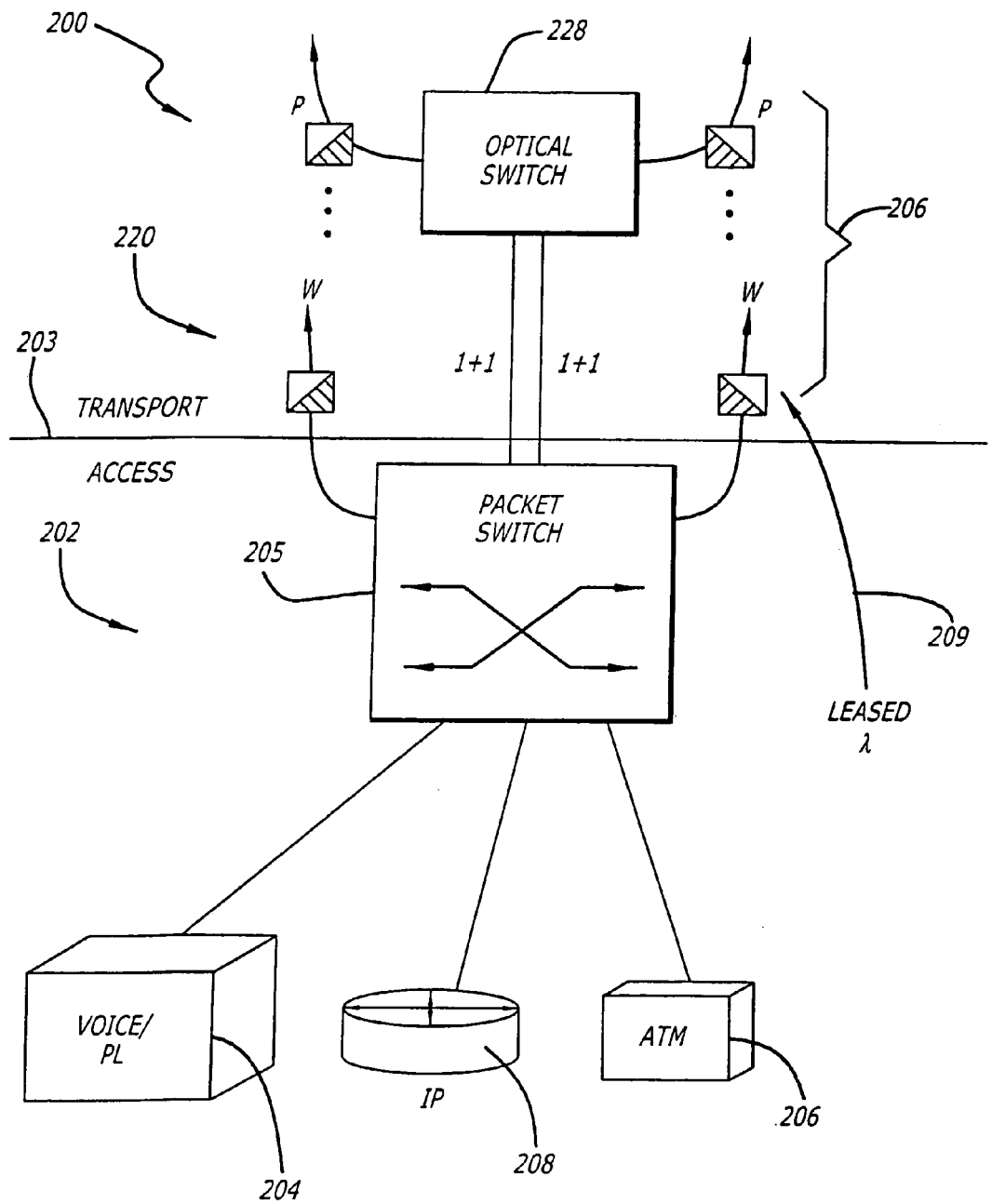
FIG. 2 is a diagram illustrating a network architecture utilizing a large packet switch for service aggregation and an optical ring network providing layer-0 optical restoration according to one embodiment of the invention.

FIG. 2 is a diagram illustrating a network architecture 200 utilizing a large packet switch 205 for service aggregation and an optical ring network backbone 206 providing layer-0 optical restoration according to one embodiment of the invention. An exemplary node (e.g. a core node or a transport node) is shown in FIG. 2 having a large packet switch 205 and an optical switch 228 both of which are connected to the optical ring network backbone 206.

An access layer 202 (below the line 203) provides various services to the transport layer 220. The transport layer 220 includes an optical ring network 206 that connects together the nodes of the optical ring network 206. In this example the services provided by the access layer 202 are: Time Division Multiplexing (TDM) voice (domestic and international) and private lines (PL) 204, voice-over IP (VoIP), Asynchronous Transfer Mode (ATM) and Frame Relay (FR) 206, Internet Protocol (IP) 208—dial-up or virtual private network (VPN), and leased λ service 209 (e.g. OC-48 rate). The private lines are supported through appropriate grooming at the transport layer 220. Similarly, the leased λ service is provided through an optical switch 228 having the protected (P) line.

At the access layer 202 (below the line 203), the network architecture 200 according to one embodiment of the invention utilizes a large packet switch 205 for service aggregation and an optical ring network 206 provides layer-0 optical restoration at the transport layer 220 (above the line 203). The optical ring network 206 includes both working and protected (W and P) lines for the transport of information.

The large packet switch 205 is coupled to the transport layer 220 and to the access layer 202. The large packet switch 205 aggregates a plurality of services (e.g. voice, IP, ATM) from the access layer 202 and transports the aggregated services via the working lines (W) of the optical ring network to other nodes of the network. The large packet switch also performs packet level grooming of the information from the services prior to transport of the information via the transport layer. The term grooming generally refers to how different traffic streams are switched and packed into higher speed streams and/or different transport protocols.

Large packet switches (sometimes termed routing switches) currently offer bandwidth today in the gigabit per second (Gbps) range and can support and aggregate multiple different types of services. Today's large packet switches have been optimized in every way to improve speed. The bus architectures of these large packet switches sometimes include switching matrices. Packet processing is often handled by dedicated processors designed specifically for that purpose. In particular, large packet switches use specifically designed ASICs (application-specific integrated circuits) that can perform routing/switching for different types of packet formats at multi-gigabit speeds. Large packet switches include hundreds of ASICs and ports to increase the bandwidth handled by these devices. An example of large packet switch is the Passport 8600 Routing Switch sold by Nortel Networks® which has a bandwidth of up to 256 Gbps. However, large packet switches are being continuously developed with ever increasing bandwidth. The network architectures of the present invention takes advantage of the bandwidth present with todays' large packet switches, as well as, the promise of tomorrow's large packet switches which will have even greater bandwidth.

Restoration is performed at a layer-0 (optical layer) of the optical ring network. Restoration can be performed, for example, in conjunction with the optical switch 228. There are various protocols to provide restoration services in the layer-0 (optical layer) of an optical network (e.g. the International Telecommunications Union has defined such protocols). In the event of the failure of a working (W) route, the channels of the failed working route are switched to any of several diversely routed restoration routes. Restoration can be achieved by using optical switches, such as acousto-optical switches. For example, optical switch 228 allows switching to the protected (P) fiber, in a time delay that is in the order of micro-seconds (μs). For four-fiber bi-directional rings, optical switches and amplifiers have been proposed to act as ADMs.

In other examples of a layer-0 (optical layer) restoration system, the working (W) routes and the protected routes can be coupled together through a large optical cross connect device. In the event of the failure of a working (W) route, the channels of the failed working route are switched to any of several diversely routed restoration routes.

Optical wavelength division multiplex (WDM) ADMs have been proposed to add/drop channels within a fiber rather than add/drop whole fibers. Such WDM ADMs are useful to overcome the limitation in capacity of traditional SONET ADMs. Many optical WDM ADMs have been proposed and demonstrated. Being able to drop channels rather than whole fibers also gives more flexibility in operating SHRs. WDM survivable rings using a single switch central office have been proposed.

The network architecture of the invention as shown in FIG. 2 and described above, by utilizing a large packet switch 205 to perform service aggregation and packet level grooming, and by performing restoration at the layer-0 (optical layer), creates a single converged network that achieves the superior restoration performance needed for carrier grade availability but at much lower costs than traditional service providers which operate multiple overlay networks. Carrier grade availability generally denotes that the network is available almost all of the time (99.999%) for all available services.

Figure 3:
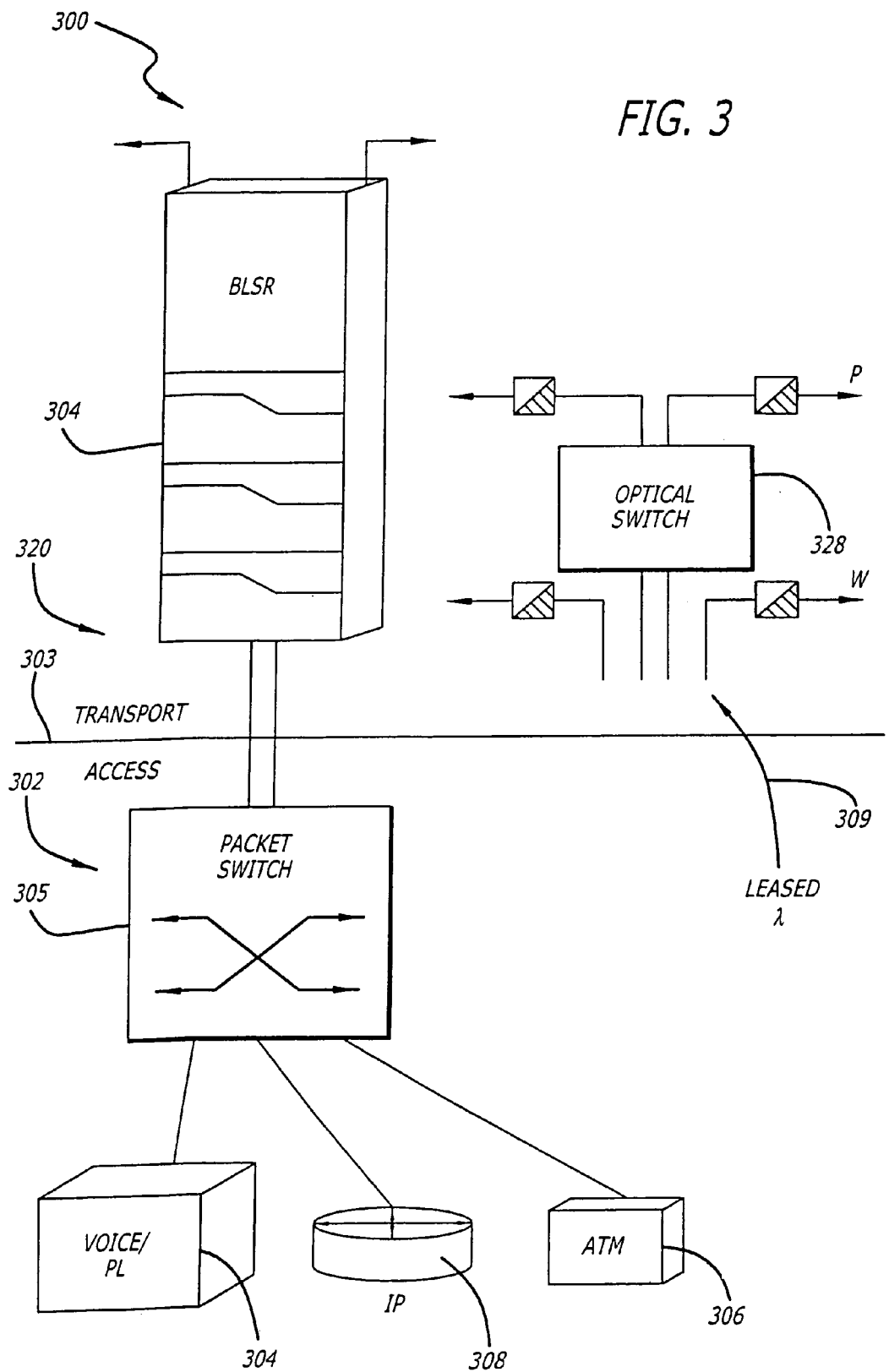
FIG. 3 is a diagram illustrating a network architecture utilizing a large packet switch for service aggregation and a BLSR network providing layer-1 SONET restoration according to one embodiment of the invention.

FIG. 3 is a diagram illustrating a network architecture 300 utilizing a large packet switch 305 for service aggregation and a BLSR network backbone 304 providing layer-1 SONET restoration according to one embodiment of the invention. An exemplary node (e.g. a core node or a transport node) is shown in FIG. 3 having a large packet switch 305 connected to the BLSR network backbone 304.

An access layer 302 (below the line 303) provides various services to the transport layer 320. The transport layer 320 includes a BLSR network 304 utilizing the SONET standard that connects together the nodes of the BLSR network 304. In this example, the services provided by the access layer 302 are: Time Division Multiplexing (TDM) voice (domestic and international) and private lines (PL) 304, voice-over IP (VoIP), Asynchronous Transfer Mode (ATM) and Frame Relay (FR) 306, Internet Protocol (IP) 308—dial-up or virtual private network (VPN), and leased λ service 309 (e.g. OC-48 rate). The private lines are supported through appropriate grooming at the transport layer 320. Similarly, the leased λ service is provided and restored through an optical switch 328 having both working and protected (W and P) lines.

At the access layer 302 (below the line 303), the network architecture 300 according to one embodiment of the invention utilizes a large packet switch 305 for service aggregation and the BLSR network 304 provides layer-1 (SONET layer) restoration at the transport layer 320 (above the line 303). The large packet switch 305 is coupled to the transport layer 320 and to the access layer 302. The large packet switch 305 aggregates a plurality of services (e.g. voice, IP, ATM) from the access layer 302 and transports the aggregated services via the BLSR network 304 to other nodes of the network. The large packet switch 305 also performs packet level grooming of the information from the services prior to transport of the information via the transport layer.

Restoration is performed utilizing layer-1 SONET restoration standards of the BLSR network 304. As previously discussed, a SONET network provides reliable transport from point to point and has the capability of providing "restoration." A SONET add-drop multiplexer ADM provides electrical switching to reroute information onto the protection fibers in the event of a failure in one or more of the fiber links. One of the most common ways in SONET to "restore" network functionality rapidly is to combine SHRs and diversity protection (DP), using add-drop multiplexers (ADMs), for automatic protection switching. Systems using One-to-n (1:n) DP have one protected fiber for n working fibers. SHR architectures may be classified into unidirectional rings, in which the duplex channel travels over a different path than the forward channel, and bi-directional line switched rings (BLSRs) where the forward channel and the duplex channel travel the same path. Bi-directional line switched rings (BLSRs) typically include two or four fibers. Using ADMs, the restoration time is typically about 50 milliseconds (ms) for BLSRs utilizing SONET protocols while path switching typically requires less than 20 ms and loopback switching typically require under 80 ms.

The network architecture of the invention as shown in FIG. 3 and described above, by utilizing a large packet switch 305 to perform service aggregation and packet level grooming, and by performing restoration at the layer-1 (SONET layer), creates a single converged network that achieves the superior restoration performance needed for carrier grade availability but at much lower costs than traditional service providers which operate multiple overlay networks.

Figure 4:
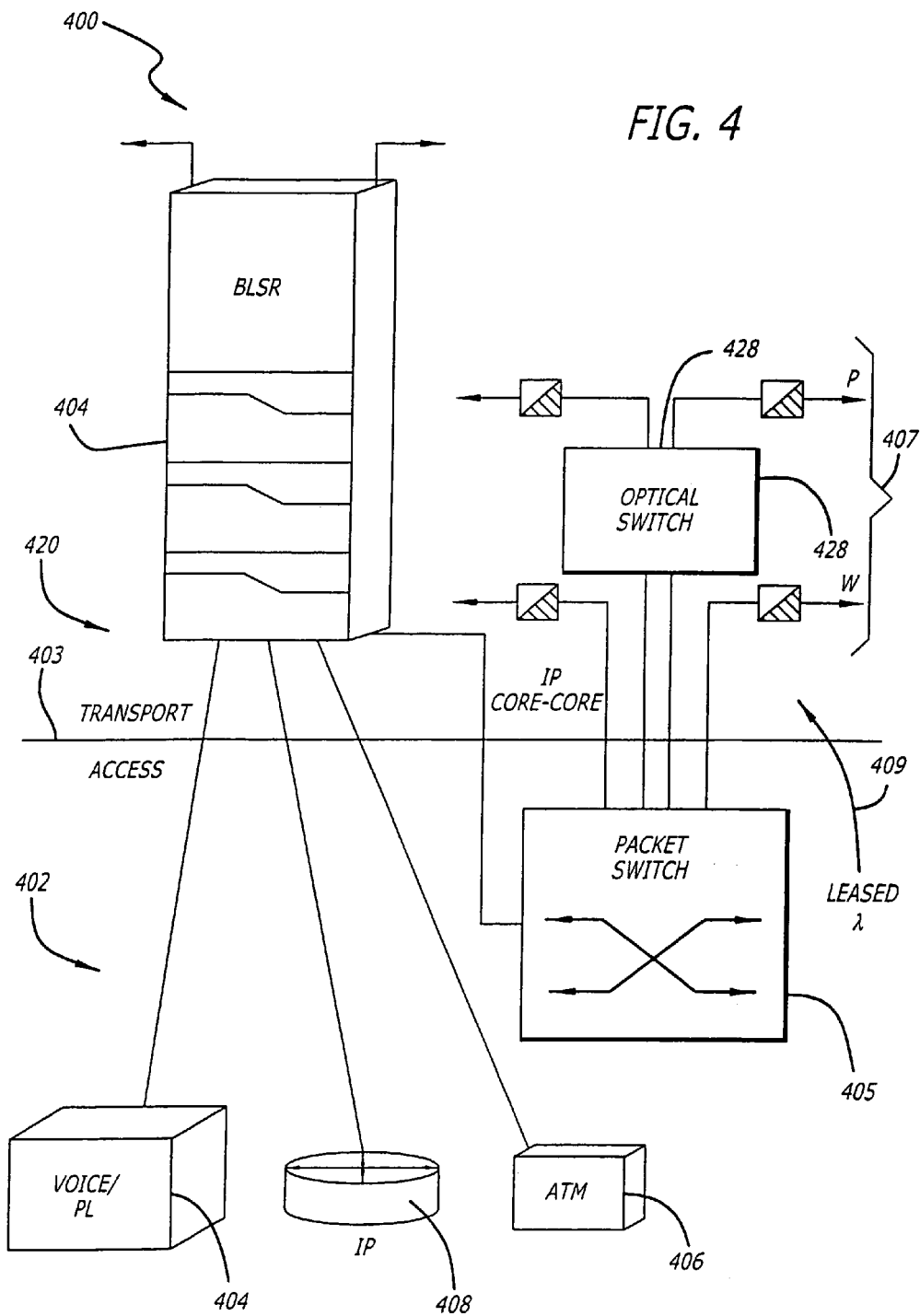
FIG. 4 is a diagram illustrating a network architecture utilizing a large packet switch for service aggregation and both a BLSR network and an optical ring network in which the IP traffic between core nodes utilizes the layer-0 optical restoration of the optical ring network and the remaining service are restored via the layer-1 SONET protocols of the BLSR network according to one embodiment of the invention.

FIG. 4 is a diagram illustrating a network architecture 400 utilizing a large packet switch 405 for service aggregation and both a BLSR network backbone 404 and an optical ring network backbone 407 in which the IP traffic between core nodes utilizes the layer-0 optical restoration of the optical ring network backbone 407 and the remaining services are restored via the layer-1 SONET protocols of the BLSR network backbone 404 according to one embodiment of the invention. An exemplary node (e.g. a core node or a transport node) is shown in FIG. 4 having a large packet switch 405 connected to both the BLSR network backbone 404 and the optical ring network backbone 407 having both working (W) and protected (P) fibers.

An access layer 402 (below the line 403) provides various services to the transport layer 420. The transport layer 420 includes the BLSR network 404 utilizing the SONET standard that connects together the core and transport nodes of the BLSR network 404 and the optical ring network 407 that connects together the core nodes of the network. In this example, the services provided by the access layer 402 are: Time Division Multiplexing (TDM) voice (domestic and international) and private lines (PL) 404, voice-over IP (VoIP), Asynchronous Transfer Mode (ATM) and Frame Relay (FR) 406, Feeder/Transport Node to Core Node Internet Protocol (IP) 408, and leased X service 409 (e.g. OC-48 rate). The private lines are supported through appropriate grooming at the transport layer 420. Similarly, the leased λ service is provided and restored through an optical switch 428 having both working and protected (W and P) lines.

At the access layer 402 (below the line 403), the network architecture 400 according to one embodiment of the invention utilizes a large packet switch 405 for service aggregation and the BLSR network 404 at the transport layer 420 (above line 403) provides layer-1 (SONET layer) restoration for all of the services except IP traffic between core nodes and the leased λ service 409. The large packet switch 405 is coupled to the transport layer 420 and to the access layer 402. The large packet switch 405 aggregates a plurality of services (e.g. voice, Transport Node to Core Node IP, ATM) from the access layer 402 and transports the aggregated services via the BLSR network 404 to other nodes of the network. The large packet switch 405 also performs packet level grooming of the information from the services prior to transport of the information via the transport layer. Further, the large packet switch 405 is also coupled to the optical ring network 407. The optical ring network 407 provides for the delivery of Core node to Core node IP information and leased λ service 409 and provides layer-0 (optical layer) restoration for IP traffic between core nodes and for the leased λ service. Both layer-0 (optical layer) restoration and layer-1 (SONET layer) restoration have been previously discussed in detail.

Figure 5:
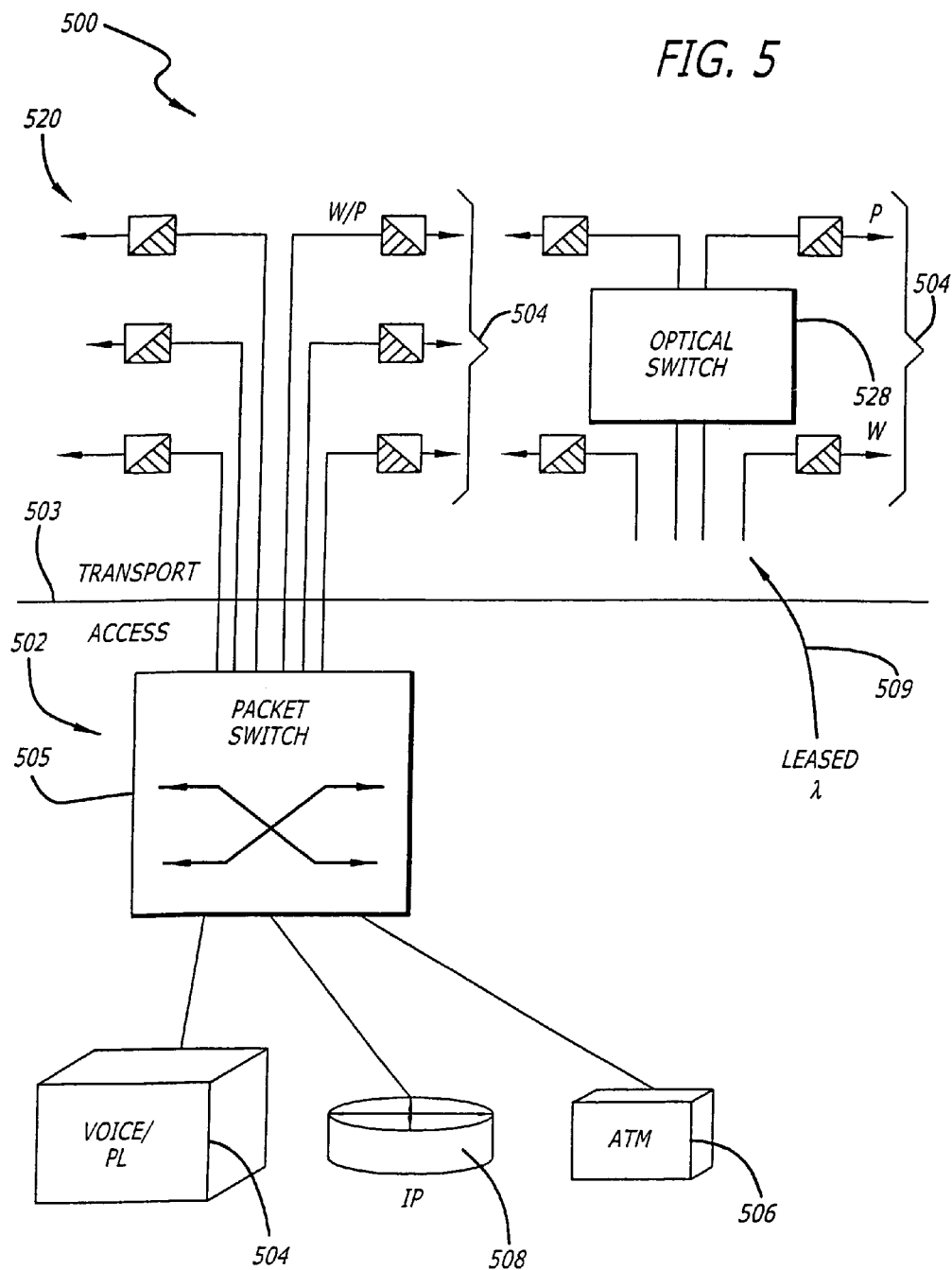
FIG. 5 is a diagram illustrating a network architecture utilizing a large packet switch for service aggregation in which the packet switch provides restoration for the aggregated services via layer-2/3 according to one embodiment of the invention.

FIG. 5 is a diagram illustrating a network architecture 500 utilizing a large packet switch 505 for service aggregation in which a packet switch 505 provides restoration for the aggregated services via layer-2/3 according to one embodiment of the invention. An exemplary node (e.g. a core node or a transport node) is shown in FIG. 5 having a large packet switch 505 connected to optical ring network backbone 504.

An access layer 502 (below the line 503) provides various services to the transport layer 520. The transport layer 520 includes an optical ring network 504 that connects together the nodes of the optical ring network 504. In this example the services provided by the access layer 502 are: Time Division Multiplexing (TDM) voice (domestic and international) and private lines (PL) 504, voice-over IP (VoIP), Asynchronous Transfer Mode (ATM) and Frame Relay (FR) 506, Internet Protocol (IP) 508—dial-up or virtual private network (VPN), and leased X service 509 (e.g. OC-48 rate). The legacy TDM voice and PL services assume circuit emulation capabilities at the network edge. The private lines are supported through appropriate grooming at the transport layer 520. Similarly, the leased k service is provided and restored through an optical switch 528 having both working and protected (W and P) lines.

At the access layer 502 (below the line 503), the network architecture 500 according to one embodiment of the invention utilizes a large packet switch 505 for service aggregation and the packet switch 505 also provides restoration for these services at layer 2/3. The large packet switch 505 is coupled to the transport layer 520 and to the access layer 502. The large packet switch 505 aggregates a plurality of services (e.g. voice, IP, ATM) from the access layer 502 and transports the aggregated services via the optical network 504 to other nodes of the network. The large packet switch 505 also performs packet level grooming of the information from the services prior to transport of the information via the transport layer.

Those skilled in the art will recognize that the network architectures illustrated in FIGS. 2-5 are only exemplary and are not intended to limit the present invention. Indeed, those skilled in the art will recognize that other alternative network architectures that utilize a large packet switch to perform service aggregation performing restoration either at the layer-0 (optical layer) or the layer-1 (SONET layer) to create a single converged network may be used without departing from the scope of the present invention.

Methods to optimize traditional service provider network architectures, as well as, the previously described novel network architectures, are also provided. First, a traffic model of various services to be carried through the network is generated. A cost optimization for the various services is performed. For traditional service provider networks, core node locations are selected for each service based upon the cost optimization for each service. In the case of the novel network architectures, core node locations are selected for the aggregated services based upon the cost optimization of the aggregated services. A set of routed transport demands is generated based upon the traffic model and the core node locations. For traditional service providers, optimized transport layer network designs are determined for each service based upon the routed transport demands of each service. In the case of the novel network architectures, an optimized converged optical transport layer network design is determined for the aggregated services based upon the routed transport demands of the aggregated services. An optimized access layer network design for the services is also determined. Advantageously, this method produces network designs that are optimized at each layer, i.e. the transport and access layer, in terms of traffic demands, and at the same time are also cost optimized at each layer, thereby minimizing the overall cost of the network solutions.

Figure 6:
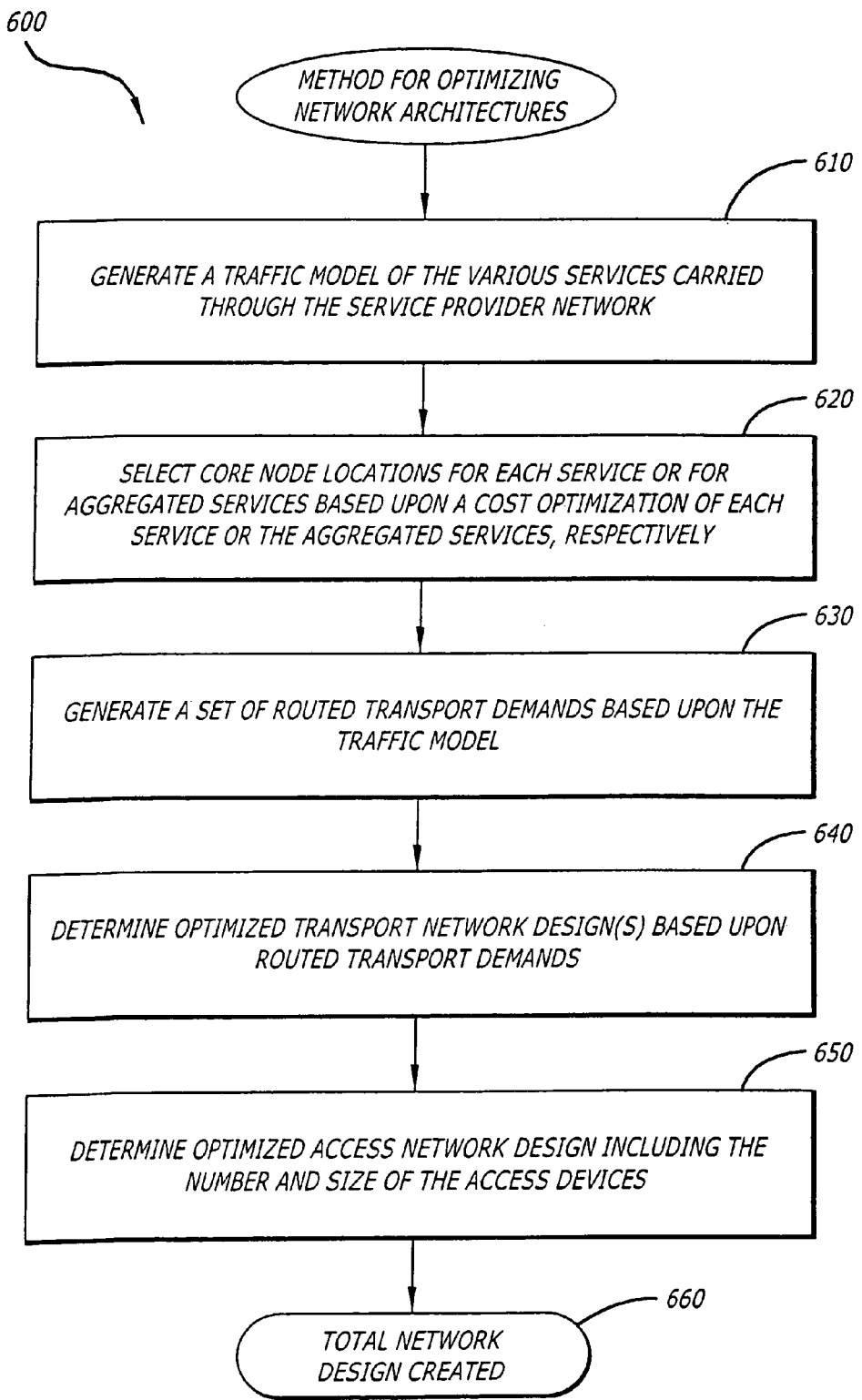
FIG. 6 is a flowchart illustrating a process for optimizing network architectures according to one embodiment of the invention.

FIG. 6 is a flowchart illustrating a process 600 for optimizing network architectures according to one embodiment of the invention. The process 600 first generates a traffic model of the various services carried through the service provider network (block 610). To implement the traffic model, a set of modeling assumptions were derived from market research reports and publicly available data for various carrier networks within the United States. (See e.g., C. Munroe, et. al., "US Small Business Landline Telecommunications Market Assessment and Forecast: 1997-2002, IDC Report #18001, December 1998; http://www.wcom.com/about_the_company/fiber_network_maps/; http://www.qwest.net/network/netmaps.html). These assumptions capture the growth, mixture, market distributions and access rates of various services provided by major U.S. service providers. Some of the key assumptions used in the traffic model are derived from the publicly available data for various U.S. carriers and are listed below:

Services:
  99.999% availability for all of the supported services
  Normalized busy hour profile and no compression for transport for TDM voice
  G.729 codec with 30 ms multi-frame and no header compression for VoIP Network:
  100 access nodes, 200 fiber routes (40,000 km) with 2.4 physical connectivity
  10 Gbps transmission
  Service specific feeder and core locations The traffic model captures the growth, mixture and market distributions of various services carried through a service provider network. The traffic model can be described as:
  $Traffic_n^0 = TND_0 * Usage\ Distribution$; n=1, 2, ..., 100
  $Traffic_n^i = (TND_i - TND_{i-1}) * Market\ Distribution + TND_{i-1}$; i=1, 2, ..., 7.

Figure 7:
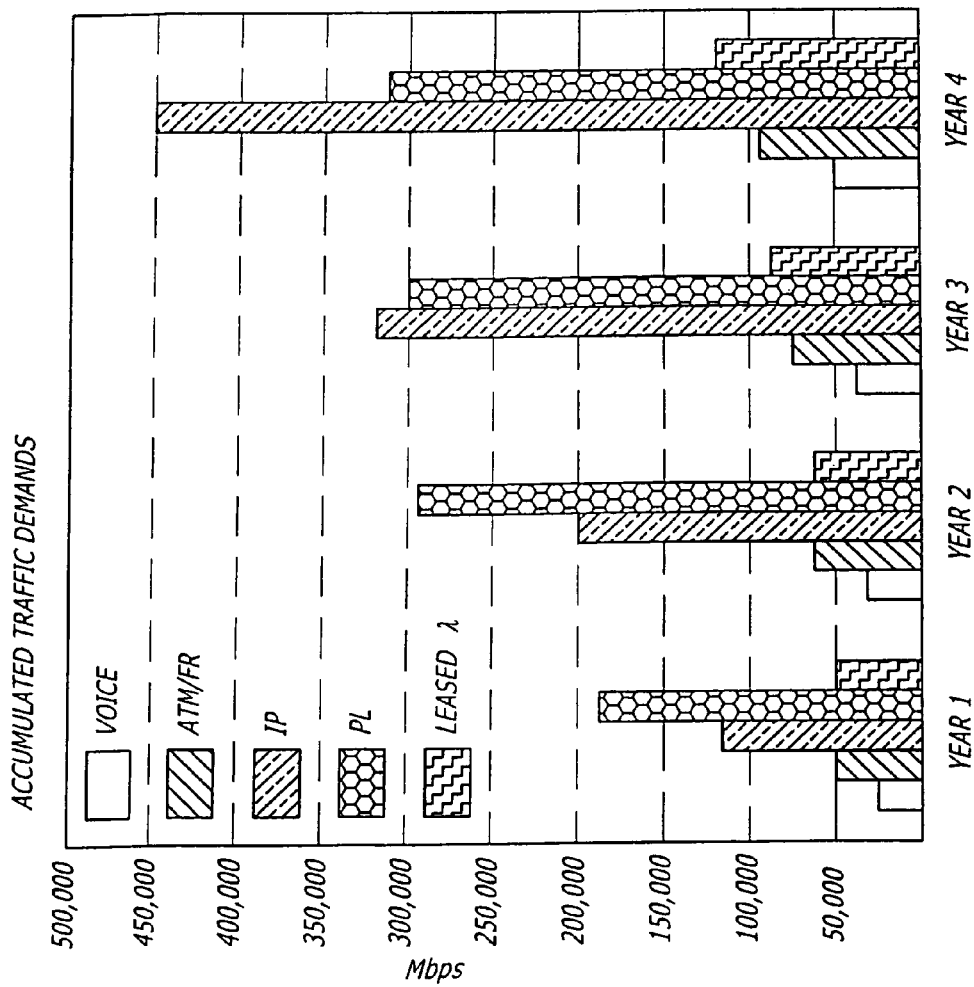
FIG. 7 is a diagram illustrating an example of accumulated traffic demands and growth rates for various services calculated by a traffic model according to one embodiment of the invention.

In the above model, 'i' is the time interval representing a six-month period starting from year 1 and ending at year 4, $Traffic_n^i$ is the traffic originated from the access node 'n' for time interval 'i' and $TND_i$ is the total network demand for interval 'i'. The 'Usage/Market Distribution' is the current/perceived distribution of traffic across various nodes in the network. These distributions are derived from various market research reports and geographical data available for different access nodes. FIG. 7 is a diagram illustrating an example of accumulated traffic demands and growth rates over a four year period for various services, calculated through the traffic model described above, according to one embodiment of the invention.

Continuing with reference to FIG. 6, the process 600 then selects core node locations from the given 100 access nodes for each service or for the aggregated services based upon a cost optimization of each service or the aggregated services, respectively (block 620). Thus, a cost optimization for the various services is performed. For traditional service provider networks (e.g. FIG. 1), core node locations are selected for each service based upon the cost optimization for each service. In the case of the novel network architectures disclose herein (FIGS. 2-5), core node locations are selected for the aggregated services based upon the cost optimization of the aggregated services. The cost optimization is generally achieved as a trade-off between switching and transport costs.

Next, the process 600 generates a set of routed transport demands based upon the traffic model and the core node locations (block 630). In particular, using the feeder/transport node to core node homing arrangements of the various access nodes and the logical A-Z demands (i.e. all the possible demands) between these nodes, a set of routed transport demands is obtained for the given network. Basically, the routed transport demands takes into account all the physical and logical demands upon the network for all the possible paths between any combination of source and destination nodes for each service individually, or the aggregated services, based upon the traffic model.

The process 600 then determines optimized transport network design(s) based upon the routed transport demands (block 640). For traditional service providers (e.g. FIG. 1), optimized transport layer network designs are determined for each service based upon the routed transport demands of each service. In the case of the novel network architectures (FIGS. 2-5), an optimized converged optical network transport layer design is determined for the aggregated services based upon routed transport demands. Furthermore, the routed transport demand is utilized during the transport network design phase to size the various links and transport nodes.

In one embodiment, the transport network design can be accomplished using an optimization tool capable of designing complex ring and mesh based networks. These sorts of optimization tools (e.g. software based optimization tools) for designing networks are well known in the art. For example, SONET planner is a well-known type of optimization tool for designing SONET based networks. Using this sort of tool, network wide BLSR or unidirectional rings can be planned and provisioned for each service (e.g. for traditional service provider networks) by the process 600. On the other hand, a network wide optical, BLSR, or unidirectional ring can be planned and provisioned for an optimized converged optical network transport layer design for the aggregated services to be used with the novel network architectures (FIGS. 2-5) of the invention by the process 600. In the scenario where restoration is performed either at the layer-0 (optical layer) or the layer-1 (SONET layer), the process 600 utilizing the tool restores each service according to the granularity offered by the given architecture. As a post-optimization step, the process 600 utilizing the tool looks for interconnected ring sharing and performs ring balancing if needed or requested.

The process 600 then determines an optimized access network design including the number and size of the access devices (block 650). The optimized access network design determines an optimal number of access devices and optimal sizing of the access devices for each service. The optimized access network design performs a detailed design at layer-2/3 in order to determine the optimal number of access devices and the optimal sizing of the access devices for each service. In one embodiment, an optimization tool can be used to the route traffic demands for various services according to the communities of interest calculated from the traffic model. Using service-specific access distributions, routed demands and device configurations, an optimal number of access devices and optimal sizing of the access devices can be calculated. Such optimization tools are well known in the art. In a packet switch scenario, the mesh restoration at layer-2/3 is performed to protect services against a single fiber cut, by providing Quality of Service (QoS)-aware diverse routes for working traffic.

The process 600 advantageously produces network designs that are optimized at each layer, i.e. the transport and access layer, in terms of traffic demands, and at the same time are also cost optimized at each layer, thereby minimizing the overall cost of the network solutions.

Comparisions of the Costs Associated with the Typical Service Provider Network (FIG. 1) and the Novel Network Architectures of the Invention (FIGS. 2-5)

Figure 8:
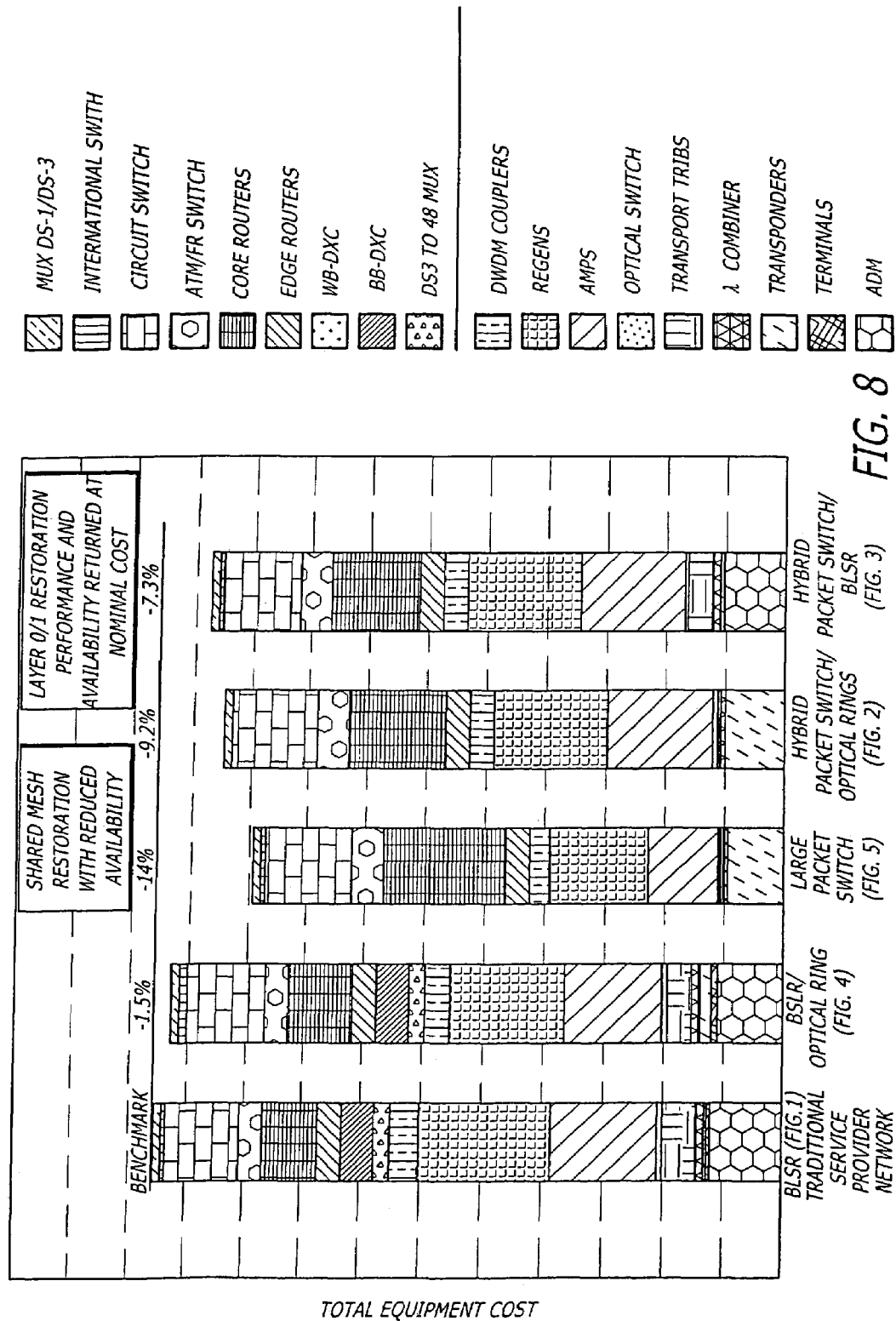
FIG. 8 is a diagram illustrating a comparison of total equipment costs for the typical service provider network (FIG. 1)

FIG. 8 is a diagram illustrating a comparison of total equipment costs for the typical service provider network (FIG. 1) versus the various novel network architectures (FIGS. 2-5) according to embodiments of the invention. The costs are determined by using typical price assumptions for generic access and transport layer devices. However, the total cost of a network architecture solution shown in FIG. 8 refers to the equipment costs only, the Operational/Administrative/Maintenance (OA&M) costs are not considered. The typical service provider network (BLSR) is used as a benchmark.

As shown in FIG. 8, the pure packet switch architecture (FIG. 5) has the least cost. The economy is achieved in both the access and the transport layers and can be attributed to the bandwidth grooming efficiency of this architecture. This is achieved by performing service aggregation and packet level grooming. Furthermore, this architecture utilizes shared mesh restoration, which reduces the spare bandwidth allocated for link failures by sharing the reserved bandwidth among different failures.

However, even though the large packet switch architecture (FIG. 5) has the least cost among the five architectures considered here, it does suffer due to some performance issues. A key requirement of next generation network architectures is to maintain carrier grade availability (i.e. 99.999% availability for all supported services). This, however, is not possible with the layer-3 restoration performance of near term routing devices. A recent experimental study of Internet routing stability concluded that the average end-to-end availability of a typical ISP network is close to 97% (See e.g., C. Labovitz, et. al., "Experimental Study of Internet Stability and Backbone Failures, 29th Annual International Symposium on Fault Tolerant Computing, pp. 278-285, 1999). However, the introduction of fast failure detection and convergence algorithms within the existing layer-3 routing protocols and facilitation of explicit route computation through Multi-protocol label switching (MPLS) should significantly enhance the viability the large packet switch architecture of FIG. 5 as a network architecture.

As shown in FIG. 8, the hybrid network architectures (FIGS. 2 and 3) of the invention by utilizing a large packet switch to perform service aggregation and packet level grooming, and by performing restoration either at the layer-0 (optical layer) or layer-1 (SONET layer), creates a single converged network that achieves the superior restoration performance needed for carrier grade availability but at much lower costs than traditional service providers which operate multiple overlay networks. Similarly, the hybrid network architecture of FIG. 4 provides analogous advantages, at a somewhat higher cost, but still lower than the traditional service provider network of FIG. 1. Hence, for the given modeling assumptions, these hybrid architectures (FIGS. 2, 3, and 4) can be used to evolve a traditional service provider networks. The availability of large packet switches capable of supporting multiple services and the maturity of optical technology are taken advantage of in the network architectures of the present invention to provide new, attractive alternatives to evolve traditional service provider networks. Further, these architectures can support a rich mixture of new and existing services without sacrificing the carrier grade availability.

Further insights can be gained by examining the cost of the regenerators and amplifiers. As shown in FIG. 8, the regenerators and amplifiers represent about 30-40% of the total equipment cost for all of the five scenarios. This cost is incurred during optical-electrical-optical conversions required on long-haul fiber routes due to limited reach of the existing optical transmission technology. Hence, a significant reduction in overall cost of a scenario can be achieved by enhancing the reach of the optical transmission through innovative technologies (See e.g., J. C. Simon, et. al., "All Optical Regeneration", 24th European Conference on Optical Communication, vol. 1, pp. 467-469, 1998).

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the code segments to perform the necessary tasks. For example, certain aspects of the methods for optimizing network architectures (for both traditional service provider networks and the novel network architectures as disclosed herein) may be implemented in software and executed by a computer. The program or code segments can be stored in a machine readable medium, such as a processor readable medium or a computer program product. The machine-readable medium or processor-readable medium may include any medium that can store information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method implemented by a computer for optimizing network architectures comprising:

generating a traffic model of a plurality of services to be carried through a network, the traffic model capturing at least one of growth, mixture, and market distributions of the plurality of services;

performing a cost optimization for at least one of the plurality of services;

selecting core node locations for the at least one service based upon the cost optimization of the at least one service;

generating routed transport demands based upon the traffic model;

determining at least one optimized transport layer network design for the at least one service based upon routed transport demands; and determining an optimized access layer network design for the at least one service.

2. The method of claim 1, wherein selecting core node locations for the at least one service includes selecting core node locations for each service of the plurality of services based upon a cost optimization for each service.

3. The method of claim 1, wherein determining the at least one optimized transport layer network design includes determining an optimized transport layer network for each service of the plurality of services based upon the routed transport demand of each service.

4. The method of claim 1, wherein determining an optimized access layer network design for at the least one service includes determining an optimal number of access devices for each service of the plurality of services and an optimal sizing of the access devices for each service.

5. The method of claim 1, wherein selecting core node locations for the at least one service includes selecting core node locations for an aggregated plurality of services based upon a cost optimization of the aggregated plurality of services.

6. The method of claim 5, wherein determining the at least one optimized transport layer network design for the at least one service includes determining an optimized converged optical network transport layer design for the aggregated plurality of services based upon routed transport demands.

7. The method of claim 5, wherein determining an optimized access layer network design for the at least one service includes determining an optimized access layer network design for the aggregated plurality of services by determining an optimal number of access devices and an optimal sizing of the access devices for each service of the aggregated plurality of services.

8. A machine-readable medium of a storage device having tangibly stored thereon instructions, which when executed by a computer, causes the computer to perform operations comprising:

generating a traffic model of a plurality of services to be carried through a network, the traffic model capturing at least one of growth, mixture, and market distributions of the plurality of services;

performing a cost optimization for at least one of the plurality of services;

selecting core node locations for the at least one service based upon the cost optimization of the at least one service;

generating routed transport demands based upon the traffic model;

determining at least one optimized transport layer network design for the at least one service based upon routed transport demands; and determining an optimized access layer network design for the at least one service.

9. The machine-readable medium of claim 8, wherein the operation of selecting core node locations for the at least one service includes selecting core node locations for each service of the plurality of services based upon a cost optimization for each service.

10. The machine-readable medium of claim 8, wherein the operation of determining the at least one optimized transport layer network design includes determining an optimized transport layer network for each service of the plurality of services based upon the routed transport demand of each service.

11. The machine-readable medium of claim 8, wherein the operation of determining an optimized access layer network design for at the least one service includes determining an optimal number of access devices for each service of the plurality of services and an optimal sizing of the access devices for each service.

12. The machine-readable medium of claim 8, wherein the operation of selecting core node locations for the at least one service includes selecting core node locations for an aggregated plurality of services based upon a cost optimization of the aggregated plurality of services.

13. The machine-readable medium of claim 12, wherein the operation of determining the at least one optimized transport layer network design for the at least one service includes determining an optimized converged optical network transport layer design for the aggregated plurality of services based upon routed transport demands.

14. The machine-readable medium of claim 12, wherein the operation of determining an optimized access layer network design for the at least one service includes determining an optimized access layer network design for the aggregated plurality of services by determining an optimal number of access devices and an optimal sizing of the access devices for each service of the aggregated plurality of services.

* * * * *